2,839,494

RESINOUS CONDENSATION PRODUCTS AND THEIR PRODUCTION

Johannes Reese, Wiesbaden-Biebrich, Germany, assignor to Chemische Werke Albert, Wiesbaden-Kastel (Amoneburg), Germany, a corporation of Germany No Drawing. Application March 24, 1955
Serial No. 496,591

12 Claims. (Cl. 260—47)

This invention is concerned with improvements in or relating to resinous condensation products and their production.

It has been proposed previously to form synthetic resins by reacting diphenols with halogen-substituted carboxylic acids and by reacting diphenols with epi- or di-halogenhydrins. In the former case, ether carboxylic acids are obtained, which also contain, depending upon the proportions of the reactants used, varying proportions of phenolic hydroxyl groups in the molecule. In the latter case, depending on the condensation conditions, high molecular resins, of varying molecular weight, are obtained which contain 1:3-glycerol ether bridges, and epoxide end-groups.

I have now found that certain novel resins of wide utility can be obtained by the combined condensation of diphenols with halogen-substituted carboxylic acids and epi- or di-halogenhydrins of trihydric alcohols in an alkaline medium. The high molecular condensation products obtained by the instant process contain ester groups due to the occurrence of an esterification reaction during the course of the reaction, between epoxide groups, or their hydrolysis products, and carboxyl groups. The ready occurrence of this esterification is not only an outward characteristic which fundamentally distinguishes the new resins of this invention from the previously known products mentioned above, but is also a factor which gives rise to one of the special properties of our new synthetic resins, namely the property of hardening by themselves or self-curing. It is known that epoxide resins, as such, can only be hardened in the presence of a hardening agent, such as a dicarboxylic acid, a dicarboxylic acid anhydride or a basic compound. Certain products obtained according to the process of this invention, however, can be hardened by heat alone, and without the addition of further substances, thereby giving horny, tough, elastic products of great hardness.

In order to obtain resins with especially good hardening properties, the three reaction components, namely the diphenol, the epi- or di-halogenhydrin and the halogen-substituted carboxylic acid, should be present in a certain quantitative ratio to one another. Thus, resins obtained by using for each mol. of diphenol, 0.8–1.2 mols. each of halogen-substituted carboxylic acid and epi- or di-halogenhydrin, have been found to have very good hardening properties.

A further advantage of the present process resides in the fact that the condensation brought about by the esterification reaction referred to above can be interrupted after any desired degree of condensation has taken place. This result can be achieved by heating the product to a desired temperature at which the reaction product is not completely hardened. In this manner products of varying, but considerable, viscosity can be obtained whose solubilities vary in a corresponding manner and which are suitable for a variety of uses. Resins can also be obtained with other properties by varying the molar ratio of the halogenated reactants, namely, the halogen-substituted carboxylic acid and the epi- or di-halogenhydrin. Thus, if, for example, the two phenolic hydroxyl groups of the diphenol are largely etherified with the halogen-substituted carboxylic acid, resins are obtained with a high acid number; if on the other hand the epi- or di-halogenhydrin is used in molar excess then the resulting products will contain more epoxide or hydroxyl groups and fewer carboxyl groups. In view of this variability, resins can be obtained by the present process which are suitable for a great variety of purposes.

By the term "diphenol" used herein I mean an aromatic compound containing two phenolic hydroxyl groups such as heretofore used in the formation of so-called epoxide resins. The hydroxyl groups may be in the same aromatic nucleus or they may be attached to different aromatic rings, which may be bonded together directly or through any other group. Suitable diphenols are, for example, p:p'-di-hydroxydiphenylpropane, p:p'-dihydroxydiphenyl, p:p'-dihydroxydiphenylmethane, resorcinol, hydroquinone and dihydroxynaphthalene and the like. In general, we prefer p:p'-dihydroxydiphenylpropane or bisphenol.

Halogen-substituted carboxylic acids such as heretofore used in the production of condensation resins with diphenols may be used in this invention. However, halogen-substituted aliphatic or arylaliphatic carboxylic acids which have a halogen atom substituted in the $\alpha$-position to the carboxyl group are especially advantageously used, such, for example, as $\alpha$-chloroacetic acid, $\alpha$-bromacetic acid, $\alpha$-chloropropionic acid, phenylchloracetic acid and phenylbromacetic acid. Acids in which the halogen atom is further removed from the carboxyl group, such as $\beta$-chloropropionic acid, can be used also, but it should be noted that the reactivity of such acids is substantially less than that of the corresponding $\alpha$-substituted acids and the reaction conditions should be selected accordingly. $\alpha$-monochloracetic acid has proved to be a particularly suitable halogen-substituted carboxylic acid.

Epi- or di-halogenhydrins such as heretofore used in the production of so-called epoxide resins may be used in the process of this invention and include, for example, epichlorhydrin, epibromhydrin, dichlorhydrin and dibromhydrin. When using dihalogenhydrins it should be borne in mind that these require one mol. more of alkali than when using epihalogenhydrins.

The molar ratio of the three components, diphenol, halogen-substituted carboxylic acid and epi- or di-halogenhydrin may be varied within wide limits. Where it is desired to etherify all phenolic hydroxyl groups it is, however, advantageous to work so that the sum of the latter two components is at least 2 mols. per mol. of diphenol, but less than 2 mols. of halogen-substituted carboxylic acid is used.

When the etherification of the diphenol is effected both by the halogen-substituted carboxylic acid and by the epi- or di-halogenhydrin it should be borne in mind that the latter are substantially more reactive than the former. It is therefore desirable to carry out the etherification first with the halogen-substituted carboxylic acid or its salts under fairly vigorous conditions and then to add the epi- or di-halogenhydrin customarily under less vigorour conditions, that is at a lower temperature. For example, cloracetic acid may be reacted first with the diphenol, advantageously at a temperature of 90–100° C., until the reaction is complete and the epi- or di-halogenhydrin then added at a lower temperature, advantageously of 20–60° C. The condensation may then be completed, usually after acidulation, by heating to a higher temperature. Customarily the alkaline reaction mixture remains clear or becomes only slightly opaque.

The quantity of alkali employed should be at least stoichiometrically equivalent to the total quantity of halogen and carboxyl groups present in the reaction. Alcohols, as well as water, serve particularly well as solvents for the condensation.

The condensation products obtained by the process according to the invention can be worked up in any convenient manner. The resin may, for example, be isolated by acidifying the reaction mixture and extracting the resin in a solvent therefor which is only partially miscible with water, such as butanol, and then washing the extract with water. Alternatively the resin, which is precipitated by the acidification, may be directly washed with water. By heating, with or without vacuum, the solvent and/or water is driven off, leaving the resin. Depending upon the molar ratios of the three components used, the temperature and duration of heating, soft to hard resins, which in many cases are self-hardening, are obtained wherein the degree of condensation can be widely influenced by the aforesaid factors.

In order to facilitate an understanding of the invention, the following examples are given by way of illustration only. In the examples the parts are expressed as parts by weight.

Example 1

One hundred four parts of α-chloracetic acid are converted to the sodium salt with 58.4 parts of caustic soda dissolved in 100 parts of water and the resulting solution is heated with a solution of 228 parts of 4:4'-dihydroxydiphenylpropane in 800 parts of 10% caustic soda solution. After the chloracetic acid has reacted, the solution is further condensed with 92 parts of epichlorhydrin, first at 40° C. and finally at 60–80° C. The reaction mixture is then acidified with dilute sulphuric acid, extracted with butanol, and the butanol extract washed free of salt and sulphuric acid with water. After distilling the resulting material, under a vacuum, until a temperature up to 150° C. is reached, a resin is obtained having a melting point of 54–58° C., an acid number of 77, an OH-number of 73.5 and a saponification number of 157. By baking the residue to a temperature of 200° C., an elastic, hardened film is obtained, which is no longer soluble in organic solvents.

Example 2

One hundred ten parts of resorcinol are heated with 94.5 parts of α-chloracetic acid, previously neutralized with caustic soda, to a temperature of 90° C. in 800 parts of 10% caustic soda solution. When the reaction is complete, the reaction mixture is cooled to 40° C. and further condensation is effected with 92.5 parts of epichlorhydrin, the mixture being finally heated to 80° C. The clear solution obtained is acidified, extracted with butanol, the butanol extract washed with water, and the butanol evaporated off. A light, heat-hardenable resin is obtained which has the following characteristics: acid number 159, saponification number 202, OH-number 213, epoxide number 0.27. (In this and in the other examples the epoxide number is a measure of the epoxidically bound oxygen in 100 g. of the substance being evaluated.) A film applied to a glass plate is fully hardened after baking for a half hour at 200° C.

Example 3

Twenty parts of p:p'-dihydroxydiphenylmethane are reacted at 90° C., in an alkaline solution, with 13.8 parts of bromacetic acid and then are condensed at 40–80° C. with 9.2 parts of epichlorhydrin. After acidification, a light resin is obtained which hardens when heated to 200° C.

Example 4

Example 3 was repeated using o:p'-dihydroxydiphenylmethane in place of p:p'-dihydroxydiphenyl-methane. A similar hardenable resin is obtained.

Example 5

A solution of 26.8 parts of 4:4'-dihydroxydiphenyl cyclohexane in 60 parts of a 20% caustic soda solution is heated at 90–100° C. with 10.8 parts of β-chloropropionic acid until completion of the reaction, as shown by titration by Volhard's method. Nine and two tenths parts of epichlorhydrin are then added in the cold and the reaction mixture is slowly heated up to 80° C. After the usual working up a soft resin is obtained.

Example 6

Twenty two and eight tenths parts of p:p'-dihydroxydiphenylpropane are reacted at 90° C. in an alkaline solution with 17 parts of phenylchloracetic acid and then are condensed with 13 parts of dichlorhydrin at a lower temperature. A total of 160 parts of 10% caustic soda solution are used in this reaction. After acidification a resin is obtained which is isolated by evaporating off the water and is finally obtained in an anhydrous state by distilling in vacuo.

Example 7

Two hundred twenty-eight parts of p:p'-dihydroxydiphenylpropane are reacted at 90° C. with 47 parts of chloracetic acid and 51 parts of β-chloropropionic acid in the presence of 120 parts of a 10% caustic soda solution. Then the reaction mixture is cooled to 40° C. and mixed with 92 parts of epichlorhydrin. Thereafter the temperature of the reaction mixture is slowly raised to 80° C., the reaction mixture is acidified with dilute sulphuric acid and extracted with butanol. After distilling off the solvent in vacuo and heating the resulting material to a temperature of 150° C. a solid resin is obtained. This resin is hardenable, as shown by baking a coating of lacquer containing the resin at 200° C. to form a hardened film.

Example 8

Ninety-four parts of chloracetic acid, in the form of its sodium salt, and 92 parts of epichlorhydrin are added to a solution of 228 parts of p:p'-dihydroxydiphenylpropane in 800 parts of caustic soda solution maintained at 40° C. After a slight increase in the temperature a resin begins to separate, but this resin is kept in solution by the addition of 300 parts of butanol. The reaction is continued for an additional four hours at 90° C. The reaction mixture is then acidified with 10% sulphuric acid, a little toluene is added, the solution is washed with water and distilled in vacuo until the residue reaches a temperature up to 150° C. A resin is obtained with an acid number of 33, a saponification number of 71.1 and an epoxide number of 0.47. The resin hardens when heated to 200° C.

Example 9

Two hundred twenty-eight parts of p:p'-dihydroxy-diphenylpropane are condensed with 75.6 parts of chloracetic acid and 34.3 parts of phenylchloracetic acid in the form of their sodium salts at about 90° C. in the presence of 800 parts of a 10% caustic soda solution. After cooling to 40° C., 94.5 parts of epichlorohydrin are added and the temperature of the reaction mixture is raised to 80° C. in the course of two hours. After acidification, a resin soluble in butanol is obtained which hardens when baked to 200° C.

Example 10

Forty-seven parts of chloracetic acid and 108 parts of phenylbromacetic acid are added to a cold solution of 110 parts of resorcinol in 400 parts of 30% caustic soda solution. Reaction between these components is brought about and completed by prolonged heating at 90° C. Then an additional 80 parts of 50% caustic soda solution together with 129 parts of α-dichlorhydrin are added. The temperature of the reaction mixture is so regulated that it slowly rises from 40° C. to 80° C. and is kept for a long period at the latter temperature. After acidification and washing with water a resin is obtained which is heat hardenable.

*Example 11*

Twenty-two and eight tenths parts of p:p'-dihydroxydiphenylpropane are dissolved in 40 parts of a 20% caustic soda solution and are condensed at 90° C. with 11.6 parts of sodium chloracetate. Then an additional 20 parts of 20% caustic soda solution are added together with 12.9 parts of dichlorhydrin and the reaction is continued at a temperature rising from 40° C. to 80° C. After acidification, the precipitated resin is taken up in butanol, the butanol extract washed with water and freed of solvent by distillation in vacuo.

The practice of this invention has been exemplified by various details and illustrative embodiments. It will be understood, however, that the details may be varied extensively and that substitutions, additions or omissions can be made without departing from the scope or spirit of the invention which is intended to be defined by the appended claims.

What is claimed is:

1. A process for the preparation of resinous condensation products which comprises mixing and reacting in an alkaline medium a diphenol having the formula:

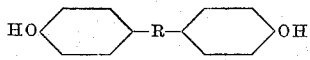

wherein R is a saturated hydrocarbon radical of 1 to 6 carbon atoms and 0.8-1.2 mol proportions of a halogen acetic acid near the boiling point of water, and then reacting the formed reaction mixture in an alkaline medium with 0.8-1.2 mol proportions of a halogen compound selected from the group consisting of epi-halogenhydrin and di-halogenhydrin at a substantially lower temperature, the amount of alkali employed being at least stoichiometrically equivalent to the halogen and carboxyl content of the reaction mixture.

2. A process according to claim 1 wherein the first reaction is carried to completion under vigorous conditions and the formed reaction product is reacted with said halogenated compound under less vigorous conditions.

3. A process according to claim 1 in which the diphenol is heated with the halogen acetic acid at a temperature of about 90-100° C. until the reaction goes to completion and then the formed reaction mixture is heated with said hologen compound at a temperature of about 20-60° C. to complete the reaction.

4. A process for the preparation of resinous condensation products which comprises mixing and reacting in an alkaline aqueous medium a diphenol having the formula:

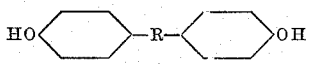

wherein R is a saturated hydrocarbon radical of 1 to 6 carbon atoms, 0.8-1.2 mol proportions of a halogen acetic acid, and 0.8-1.2 mol proportions of a halogen compound selected from the group consisting of epi-halogenhydrin and di-halogenhydrin, the amount of alkali employed being at least stoichiometrically equivalent to the halogen and carboxyl group content of the reaction mixture, acidulating the formed alkaline reaction mixture and separating the acidulated material from the aqueous medium, and heating the separated material at a baking temperature of about 200° C. to form a hard elastic resin.

5. A resinous condensation product, the reaction product of a diphenol having the formula:

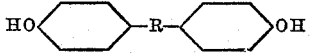

wherein R is a saturated hydrocarbon radical of 1 to 6 carbon atoms, 0.8-1.2 mol proportions of a halogen-substituted acetic acid and 0.8-1.2 mol proportions of a halogen compound selected from the group consisting of epi-halogenhydrin and di-halogenhydrin, said reaction product being formed in an alkaline medium containing an amount of alkali at least stoichiometrically equivalent to the halogen and carboxyl group content of the reaction mixture.

6. A resinous condensation product, the reaction product of a p:p'-dihydroxydiphenylpropane, 0.8-1.2 mol proportions of a halogen-substituted acetic acid and 0.8-1.2 mol proportions of a halogen compound selected from the group consisting of epi-halogenhydrin and di-halogenhydrin, said reaction product being formed in an alkaline medium containing an amount of alkali at least stoichiometrically equivalent to the halogen and carboxyl group content of the reaction mixture.

7. A resinous condensation product, the reaction product of p:p'-dihydroxydiphenylpropane, 0.8-1.2 mol proportions of chloracetic acid, and 0.8-1.2 mol proportions of a halogen compound selected from the group consisting of epi-halogenhydrin and di-halogenhydrin, said reaction product being formed in an alkaline medium containing an amount of alkali at least stoichiometrically equivalent to the halogen and carboxyl group content of the reaction mixture.

8. A resinous condensation product, the reaction product of p:p'-dihydroxydiphenylpropane, 0.8-1.2 mol proportions of a halogen-acetic acid, a phenyl halogen-acetic acid and 0.8-1.2 mol proportions of a halogen compound selected from the group consisting of epi-halogenhydrin and di-halogenhydrin, said reaction product being formed in an alkaline medium containing an amount of alkali at least stoichiometrically equivalent to the halogen and carboxyl group content of the reaction mixture.

9. A resinous condensation product, the reaction product of p:p'-dihydroxydiphenylpropane, 0.8-1.2 mol proportions of chloracetic acid and 0.8-1.2 mol proportions of epi-halogenhydrin, said reaction product being formed in an alkaline medium containing an amount of alkali at least stoichiometrically equivalent to the halogen and carboxyl group content of the reaction mixture.

10. A resinous condensation product, the reaction product of dihydroxydiphenylpropane, 0.8-1.2 mol proportions of phenyl halogen-acetic acid and 0.8-1.2 mol proportions of a halogen compound selected from the group consisting of epi-halogenhydrin and di-halogenhydrin, said reaction product being formed in an alkaline medium containing an amount of alkali at least stoichiometrically equivalent to the halogen and carboxyl group content of the reaction mixture.

11. A resinous condensation product, the reaction product of p:p'-dihydroxydiphenylmethane, 0.8-1.2 mol proportions of a halogen-acetic acid and 0.8-1.2 mol proportions of a halogen compound selected from the group consisting of epi-halogenhydrin and di-halogenhydrin, said reaction product being formed in an alkaline medium containing an amount of alkali at least stoichiometrically equivalent to the halogen and carboxyl group content of the reaction mixture.

12. A resinous condensation product, the reaction product of p:p'-dihydroxydiphenylmethane with 0.8-1.2 mol proportions of halogen acetic acid and with 0.8-1.2 mol proportions of epi-halogenhydrin, said reaction product being formed in an alkaline medium containing an amount of alkali at least stoichiometrically equivalent to the halogen and carboxyl group content of the reaction mixture.

References Cited in the file of this patent

UNITED STATES PATENTS 2,444,594    Day et al. ---------------- July 6, 1948